Figure 3:
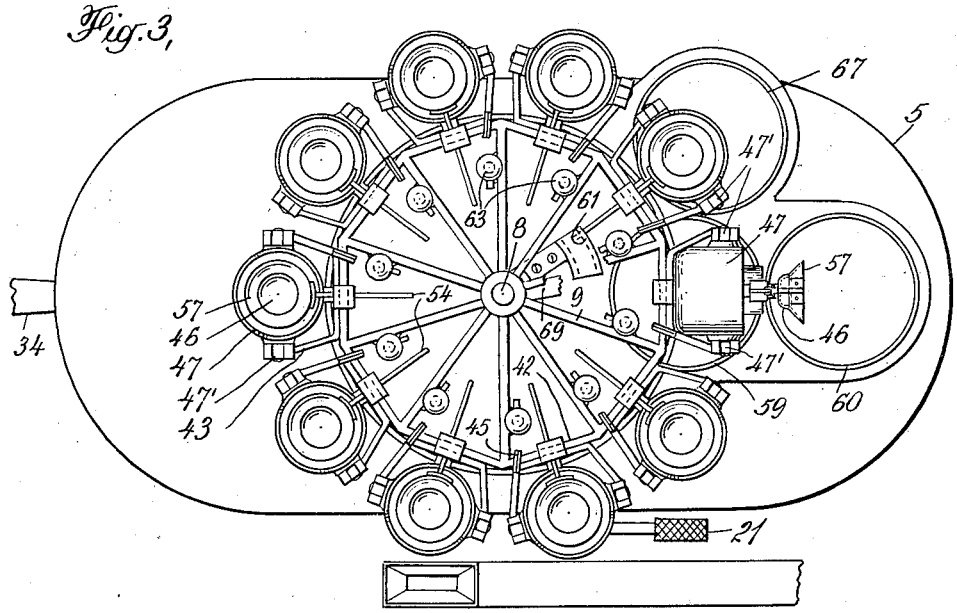

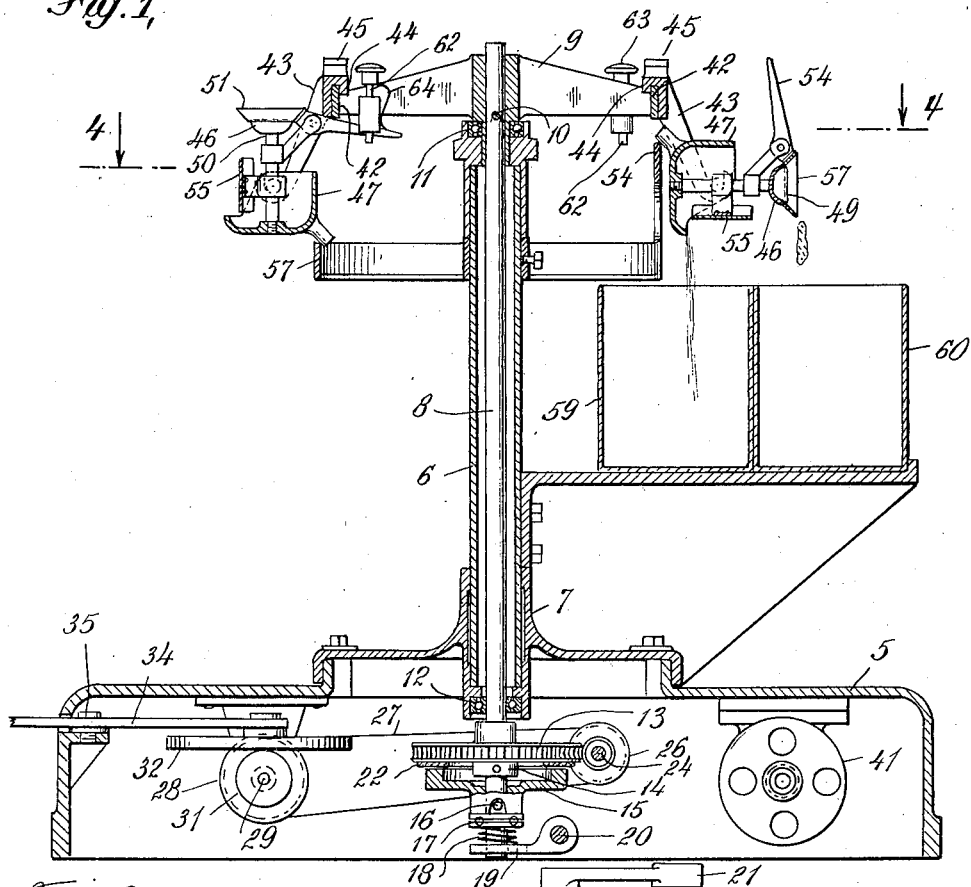

Feb. 18, 1930.　　　J. W. ESKHOLME　　　1,747,432
APPARATUS FOR SEPARATING AND COLLECTING THE WHITES AND YOLKS OF EGGS
Filed July 27, 1928　　　4 Sheets-Sheet 2

INVENTOR
John W. Eskholme
BY
Pennie Davis Marvin & Edmonds
ATTORNEYS

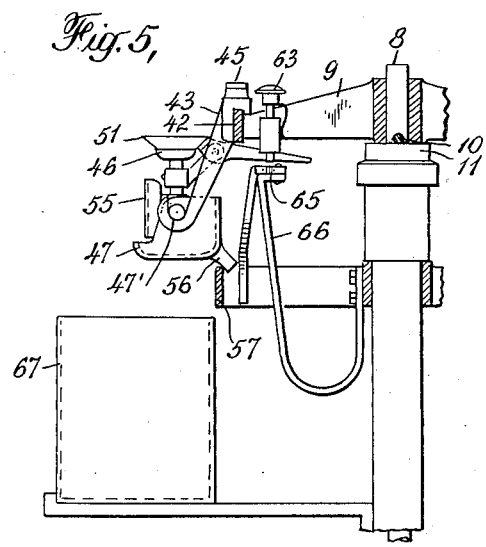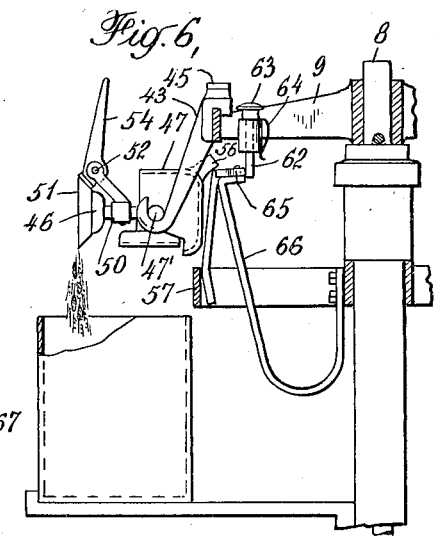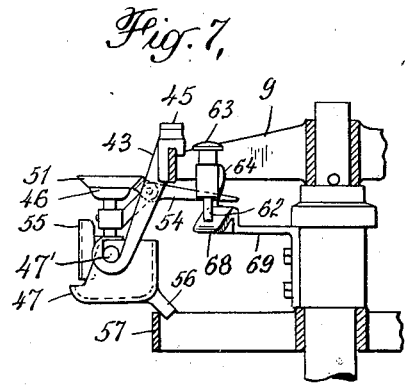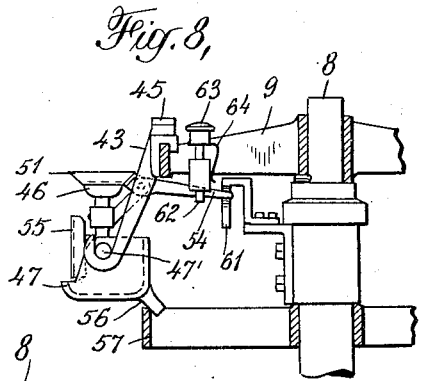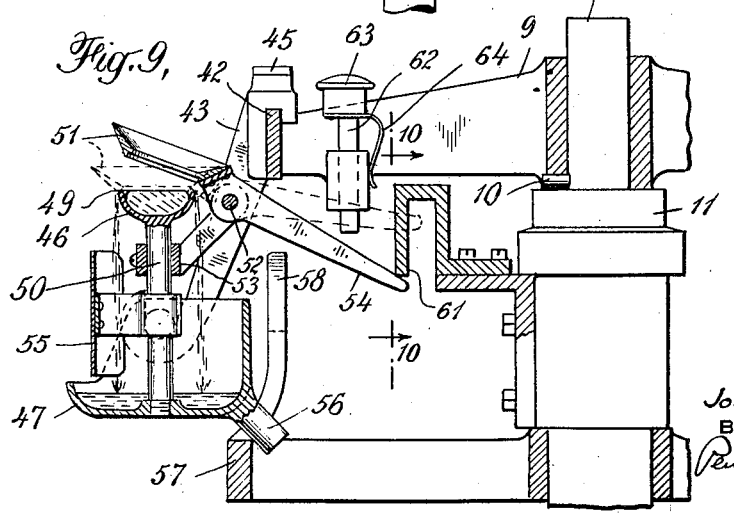

Feb. 18, 1930. J. W. ESKHOLME 1,747,432
APPARATUS FOR SEPARATING AND COLLECTING THE WHITES AND YOLKS OF EGGS
Filed July 27, 1928 4 Sheets-Sheet 4
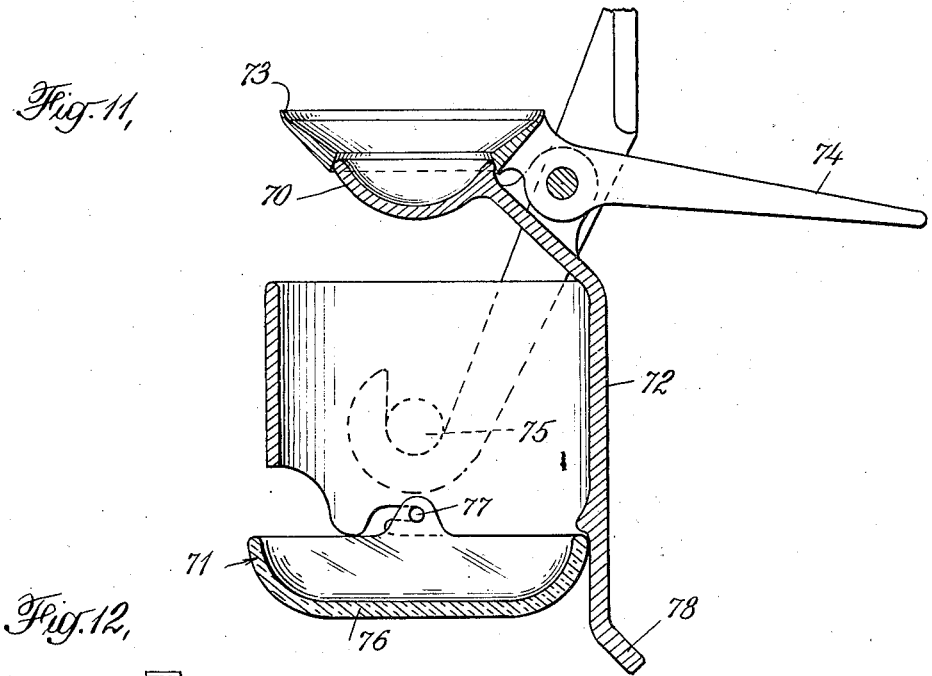
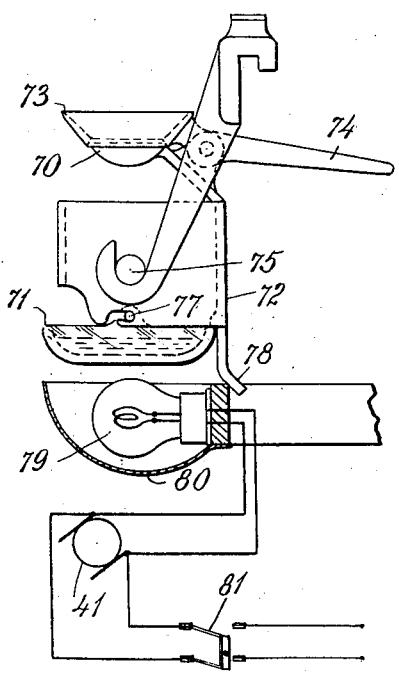
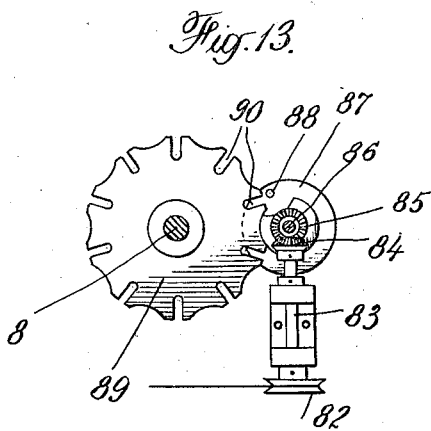
INVENTOR
John W. Eskholme
BY
*Pennie Davis Marvin & Edmonds*
ATTORNEYS Patented Feb. 18, 1930

1,747,432

UNITED STATES PATENT OFFICE

JOHN W. ESKHOLME, OF EAST ORANGE, NEW JERSEY

APPARATUS FOR SEPARATING AND COLLECTING THE WHITES AND YOLKS OF EGGS

Application filed July 27, 1928. Serial No. 295,632.

This invention relates to apparatus for separating and collecting the whites and yolks of eggs.

There is a growing demand for the separated whites and yolks of eggs in bulk for use in various food preparations. The separation of the contents of an egg is, however, a delicate operation which heretofore has been performed manually because no practicable apparatus for that purpose has been available. To separate the contents of the eggs usually requires the employment of skilled operators. The operation is inefficient and costly. Furthermore it has been practically impossible in the operation as heretofore conducted to segregate spoiled eggs before the contents were mixed with the wholesome product. Considerable losses have resulted from this source.

It is the object of the present invention to provide a simple and effective apparatus wherein the white of eggs are separated from the yolks and collected in different containers.

Another object of the invention is the provision of an apparatus in which the weak yolks which break and mingle with the whites are deposited in another container.

A further object of the invention is the provision of means whereby spoiled eggs can be eliminated before the contents thereof contaminate the separated products.

Other objects of the invention are the provision of an apparatus which can be cleaned readily and is, therefore, sanitary and which requires no special skill and cannot injure the operator.

In carrying out the invention, I provide a suitable conveyor or support, preferably a rotating table for a plurality of separating receptacles each adapted to receive the contents of an egg. The receptacles may include, for example, a "cup and saucer", the cup being intended to retain the yolk while the white is permitted to overflow into the saucer. Thus the separation is readily effected. The operator merely breaks an egg as each receptacle is advanced to her station and dumps the contents into the receptacle.

The conveyor is advanced continuously so that the receptacle containing the egg is moved immediately from the operator's station and a fresh receptacle is presented. The speed of movement may be slow enough to permit the operator to check the operation as it proceeds and to take any steps which may be necessary to avoid contamination of the product.

Each receptacle is pivotally supported on the conveyor and travels normally in an upright position. At a convenient point the receptacle is tilted by mechanism provided for that purpose, and the contents of the cup and saucer are discharged into separate containers for the white and yolk. The desired products are thus separately collected as each receptacle reaches the discharge station. The receptacle is then righted and again advances to the operator's station.

It frequently happens that the yolks of individual eggs are weak, so that they are ruptured when the shell is broken. The yolk then mixes with the white and cannot be separated. Provision is made, therefore, whereby the operator may cause any receptacle to tilt before it reaches the normal discharge station, thus discharging the contents into another container in which the mixed product is collected. Thus the possibility of degrading the products is avoided.

Similarly unwholesome eggs are found at intervals. To avoid contamination of the product, the apparatus is arranged so that the operator may bring the broken shell into proximity with her nose after the contents are dumped into the contiguous receptacle. The spoiled eggs are readily detected. Each receptacle is supported loosely in the conveyor and the operator may withdraw it without disturbing the operation of the apparatus before the receptacle reaches the discharge station. A fresh receptacle may be substituted immediately and the receptacle containing the spoiled egg can be removed and sterilized before it is again used. There is no danger, therefore, of spoiling the products by introducing unwholesome material thereto.

The cup and saucer and other exposed parts of the mechanism may be made by any metal which is not subject to corrosion. Aluminum may be used advantageously. I have found, however, that when the yolk is broken it tends to stick to the surface of the cup if the exposed surface is aluminum. This difficulty is readily overcome, however, by plating the exposed surface with a suitable metal and particularly with chromium. The yolk does not stick to chromium which, moreover, affords a hard, non-corrodible surface adapted to remain bright indefinitely under all conditions to which the machine is subjected in use. The cup and other parts can be made also of stainless steel, for example, the steel known as "Allegheny metal" containing preferably about 18% of chromium, 10% of nickel and .04% of carbon.

Although the saucer may be made of metal, it may be desirable to provide the saucer with a glass bottom which may be attached to the body by means of a bayonet joint or similar connection so that it is easily removable. The glass bottom has the added advantage that an illuminating device such as an electric lamp may be disposed in the machine so that the light therefrom is directed through the bottom at a suitable point in the travel of the saucer when the white of the egg has been delivered thereto. The light enables the operator to judge the quality of the product before it is discharged into the bulk container in a manner similar to the practice in candling eggs.

The driving mechanism is enclosed within a suitable casing which also excludes water so that the structure can be washed frequently. The driving motor is connected through a variable speed friction drive and a light clutch, and the operator can stop the movement of the conveyor by grasping any part thereof, even when the clutch is engaged. A pedal connected to the clutch may be actuated to hold the clutch in engagement when the machine is operated. When the pedal is released the conveyor stops. Owing to the light friction drive, the apparatus is safe and the operator cannot be injured thereby.

The connection between the driving mechanism and the conveyor may be such as to permit intermittent movement so that the receptacles are advanced step by step from the operator's station to the discharge station. Any suitable intermittent driving connection such as a star wheel may be employed.

Figure 4:
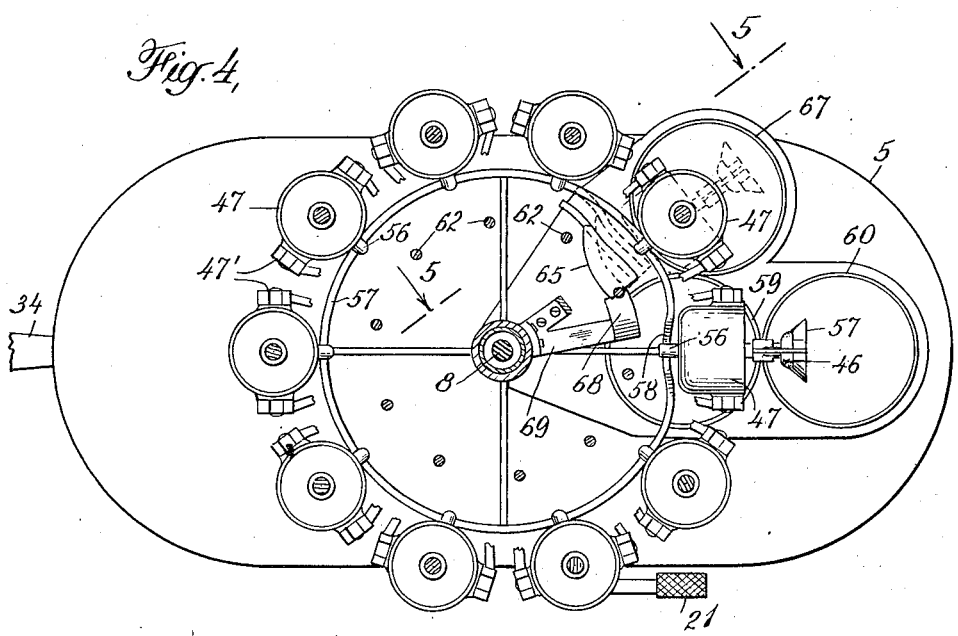

The apparatus as described is simple and compact, and it operates efficiently for the intended purpose. It will be better understood by reference to the detailed description and accompanying drawing, in which Fig. 1 is a vertical section through the apparatus, Fig. 2 is a bottom plan view of the base of the machine and the operating mechanism therefor, Fig. 3 is a top plan view of the machine, Fig. 4 is a section on the line 4—4 of Fig. 1, Fig. 5 is a detail in section on the line 5—5 of Fig. 4, Fig. 6 is a view similar to Fig. 5 illustrating another position of the parts, Fig. 7 is a detail in section of a part of the mechanism illustrated in Figs. 5 and 6, Fig. 8 is a detail in section similar to Fig. 7, Fig. 9 is an enlarged sectional view of the separating receptacle and operating mechanism therefor, Fig. 10 is a section on the line 10—10 of Fig. 9, Fig. 11 is a sectional view of a modified cup and saucer, Fig. 12 is a diagram illustrating the illumination of the saucer, and Fig. 13 is a plan view of an intermittent driving mechanism.

Referring to the drawing, 5 indicates a base or housing for the driving mechanism. A column 6 is supported by a pedestal 7 which is secured to the base 5. A shaft 8 extends through the column 6 and carries at its upper end a spider 9 which forms a table or support. The spider is connected to the shaft by a pin and slot connection 10 so that it may be removed readily from the machine. Ball bearings 11 and 12 maintain the shaft in alignment and ensure the movement thereof with the minimum degree of friction.

A worm wheel 13 is loosely mounted on the shaft at the lower end thereof within the housing 5 and is supported on a collar 14. A clutch 15 is keyed to the shaft by a pin and slot connection 16 and is supported through a ball bearing 17 and a spring 18 on a forked arm 19. The latter is supported on a shaft 20 which extends through the wall of the base 5 and is provided with a foot pedal 21. Thus when the foot pedal is depressed the clutch 15 is elevated and is held resiliently in engagement with a friction surface 22 on the underside of the worm wheel 13. Any suitable friction material may be employed to afford a light driving connection which, because of the interposition of the spring 18, permits slipping of the clutch upon the slightest resistance to the rotation of the shaft.

The worm wheel 13 is driven by a worm 23 on a shaft 24 which is supported by bearings 25 on the underside of the base 5. A pulley 26 on the shaft 24 is connected by a belt 27 to a pulley 28 on a shaft 29 supported in a bearing 30 on the underside of the base 5. The shaft 29 carries a friction disk 31 which engages a friction disk 32 rotatably supported at 33 on an arm 34. The latter is pivoted at 35 and extends through an opening in the base 5. By manipulating the arm 34 the friction disk 32 may be shifted to afford a variable speed connection between the friction disk 31 and a friction disk 36 mounted on a shaft 37 which is supported in a bearing 38 on the underside of the base 5. A pulley 39 is secured to the shaft 37 and is driven by a belt 40 from a source of power such as an electric motor 41. Thus power may be transmitted at variable speeds from the source of power to the shaft 8 to drive the machine.

The spider 9 is provided at its periphery with bars 42 which afford supports for hangers 43, each hanger being provided with a depending lip 44 whereby it is retained in position on the spider. Each hanger also carries a knife edge 45 which may be utilized in cracking the shell of the egg.

Each hanger affords a support for a receptacle comprising a cup 46 and a saucer 47. The cup is supported on the saucer 47 by a rod 50 and is provided with a rounded peripheral rim 49 and with a movable rim 51. The latter is pivoted at 52 on a bracket 53 and has a projecting tail 54. The saucer is provided with trunnions 47' which are loosely supported in the corresponding hanger 43, thus permitting pivotal movement of the receptacle. As indicated in Fig. 9, the receptacle permits the separation of the white from the yolk of the egg. The contents of the egg are dumped into the cup which retains the yolk. When the movable rim 51 is lifted as hereinafter described, the white overflows and falls into the saucer. Thus each egg is separated into its component parts, which are carried forward, as the machine advances, in the cup and saucer. A shield 55 supported on the rod 50 prevents the white from dripping into the receptacle for the yolks when the receptacle is tilted.

Each saucer is provided with a finger 56 which rests on a cam track 57 so that as the spider rotates the receptacle is held in upright position during the major portion of its travel. At one side of the machine the cam track 57 is elevated at 58 (Figs. 1 and 9) and the finger 56 rides up over the elevation, causing the receptacle to be tilted to discharge the contents thereof into separate containers 59 and 60 in which the yolks and whites respectively are accumulated. As soon as the finger 56 passes the elevation 58 the receptacle is righted and it travels thence to the operator's station to receive another egg.

Before the finger 56 reaches the elevated portion 58 of the cam track 57 the tail 54 engages a cam 61 (Figs. 9 and 10) and as the receptacle advances the movable rim 51 is lifted to permit the white of the egg to overflow into the saucer, leaving the yolk in the cup. The tail 54 passes the cam 61 and the rim is returned to its normal position before the white and yolk are discharged.

To permit the premature discharge of the contents of any receptacle, when, for example, a broken yolk is included therein, I provide a number of manually operable plungers 62 on the spider 9 opposite each of the hangers 43. An operating knob or button 63 is disposed at the end of each plunger where it may be reached readily by the operator. A spring 64 normally holds each plunger in its elevated position. When a plunger is depressed (Fig. 6) it is adapted to engage a cam track 65 which is supported by a resilient bracket 66. The cam track 65 is forced outwardly into the path of the finger 56 on the corresponding saucer, and the receptacle is thus tilted to discharge the contents thereof into another container 67 which is intended to receive the mixed yolks and whites. The cam track 65 is placed in advance of the elevation 58 and of the cam 61 so that in the event that the operator sees a broken yolk and pushes the corresponding button 60 the mixture is discharged before the receptacle reaches the normal discharging station and contamination of the product is avoided. Upon continued movement of the spider the cam track 65 is permitted to return to its normal position (Fig. 5) and the depressed plunger 62 rides onto a cam track 68 (Fig. 7), supported on a bracket 69, which forces the plunger upwardly and resets it for the succeeding operation. The normal operation of the apparatus continues until another plunger 59 is depressed.

It will be observed that the separating receptacles including the hangers 43 are removably supported and that consequently if an unwholesome egg is dumped into one of the separating receptacles by the operator and is detected by the odor emanating from the shell, the operator may immediately withdraw the separating receptacle and its hanger, thus removing the objectionable material from the apparatus. A fresh hanger and separating receptacle can be substituted immediately.

In Fig. 11 of the drawing I have illustrated a receptacle comprising a cup 70 and saucer 71. The cup is supported by a bracket 72 on the saucer and is provided with a movable rim 73 pivotally mounted on the bracket 72 and having a tail 74. The saucer is supported by trunnions 75 as in the preceding embodiment. The bottom 76 of the saucer is made of glass and is removably connected thereto by bayonet joints 77. A finger 78 on the saucer is adapted to engage a cam track to tilt the receptacle at the proper station. The operation is as heretofore described, the receptacles being supported in the hangers so that they are advanced from station to station as the conveyor rotates.

To facilitate examination of the white of the egg in the saucer, I provide an electric lamp 79 opposite the cam 57 and beneath the path of the receptacle. A shield 80 directs the light through the glass bottom of each saucer as it advances. The light is transmitted through the white of the egg in the saucer and the trained operator by observing the transmitted light can determine whether the egg white is of good quality. If the quality is off-grade, the receptacle can be removed before the contents are delivered to the container.

The lamp 79 may be connected to the electrical circuit including the motor 41 as indicated in Fig. 12. A switch 81 may be provided to start the motor and to supply current simultaneously to the lamp. When the motor is stopped the current supply to the lamp is cut off automatically.

In Fig. 13 an intermittent driving connection is provided. A pulley 82 corresponding to the pulley 26 in Fig. 2 is provided on a shaft 83 which carries a bevel gear 84 meshing with a bevel gear 85 on a shaft 86. The latter carries a disk 87 with a pin 88 thereon which is adapted to engage a star wheel 89 which replaces the worm wheel 13 in Fig. 2. The star wheel has a plurality of notches 90 corresponding to the number of hangers and egg-separating receptacles on the conveyor. When the pin 88 engages each notch 90 the shaft 8 is turned if the clutch 15 is engaged. Thus the receptacles are advanced step by step from the operator's station to the discharge station.

The operation of the apparatus as described is readily controlled and requires no skill other than that necessary to crack the eggs. As each egg is cracked the contents are deposited in one of the separating receptacles. Thereafter the separation and discharge of the products proceeds automatically and without attention of the operator. If a yolk is broken, the operator needs merely to touch the corresponding plunger and thus modify the operation so that the product is discharged into a separate container. The removal of unwholesome eggs is accomplished with similar ease and the purity of the product is thus assured. The apparatus affords a simple and convenient means for accomplishing the separation and collection of the yolks and whites of eggs. The operation is much more efficient than is otherwise possible.

Various changes may be made in the details of the structure and mode of operation of the apparatus without departing from the invention or sacrificing any of the advantages thereof.

I claim:

1. In an apparatus of the character described, the combination of a plurality of receptacle units each comprising means for separating and holding respectively the yolk and the white of an egg, means for conveying the receptacle units and means for discharging the contents thereof.

2. In an apparatus of the character described, the combination of a plurality of pivoted receptacle units each comprising means for separating and holding respectively the yolk and the white of an egg, means for conveying the receptacle units and means for tilting the receptacle units to discharge the contents thereof.

3. In an apparatus of the character described, the combination of a rotatable table, a plurality of receptacle units pivoted thereon and each comprising means for separating and holding respectively the yolk and the white of an egg, and means for tilting the receptacle units to discharge the contents thereof.

4. In an apparatus of the character described, the combination of a rotatable table, a plurality of receptacle units pivoted thereon and each comprising means for separating and holding respectively the yolk and the white of an egg means for tilting the receptacle units to discharge the contents thereof, and means for rotating the table including a source of power and a driving connection between the source of power and the table.

5. In an apparatus of the character described, the combination of a rotatable table, a plurality of receptacle units pivoted thereon and each comprising means for separating and holding respectively the yolk and the white of an egg, means for tilting the receptacle units to discharge the contents thereof, and means for rotating the table including a source of power and a variable speed drive between the source of power and the table.

6. In an apparatus of the character described, the combination of a rotatable table, a plurality of receptacle units pivoted thereon and each comprising means for separating and holding respectively the yolk and the white of an egg, means for tilting the receptacle units to discharge the contents thereof, and means for rotating the table including a source of power and a variable speed drive and friction clutch between the source of power and the table.

7. In an apparatus of the character described, the combination of a plurality of receptacle units each comprising means for separating and holding respectively the yolk and the white of an egg, means for conveying the receptacle units and means for automatically and successively discharging the contents thereof.

8. In an apparatus of the character described, the combination of a plurality of receptacles each comprising means for separating and holding respectively the yolk and the white of an egg, means for conveying the receptacles, means for automatically and successively discharging the contents thereof, and means controllable at will to discharge a selected receptacle before it reaches the normal discharge station.

9. In an apparatus of the character described, the combination of a plurality of receptacle units each comprising means for separating and holding respectively the yolk and the white of an egg, means for conveying the receptacle units and means for automatically and successively discharging the contents thereof, including a cam track and means on the receptacle units to engage the track.

10. In an apparatus of the character described, the combination of a plurality of receptacles each comprising means for separating and holding respectively the yolk and the white of an egg, means for conveying the receptacles, means for automatically and successively discharging the contents thereof including a cam track and means on the receptacle to engage the track and an auxiliary cam track adapted to be interposed at will in the path of a selected receptacle to discharge the contents thereof before it reaches the normal discharge station.

11. In an apparatus of the character described, the combination of a conveyor and a plurality of receptacle units removably supported in pivotal relation thereon and comprising means for separating and holding the yolk and the white of an egg, and means for tilting the receptacle units automatically and successively to discharge the contents thereof.

12. In an apparatus of the character described, the combination of a conveyor and a plurality of receptacle units removably supported in pivotal relation thereon and comprising means for separating and holding the yolk and the white of an egg, and means for tilting the receptacle units automatically and successively to discharge the contents thereof, including a cam track and means on the receptacle units to engage the cam track.

13. In an apparatus of the character described, the combination of a rotatable table and a plurality of receptacle units removably supported in pivotal relation thereon and comprising means for separating and holding the yolk and the white of an egg, and means for tilting the receptacle units automatically and successively to discharge the contents thereof.

14. In an apparatus of the character described, the combination of a rotatable table and a plurality of receptacle units removably supported in pivotal relation thereon and comprising means for separating and holding the yolk and the white of an egg, and means for tilting the receptacles automatically and successively to discharge the contents thereof, including a cam track and means on the receptacle units to engage the cam track.

15. In an apparatus of the character described, the combination of a rotatable table and a plurality of receptacle units removably supported in pivotal relation thereon and comprising means for separating and holding the yolk and the white of an egg, and manually controllable means to tilt and discharge the contents of selected receptacle units.

16. In an apparatus of the character described, the combination of a rotatable table and a plurality of receptacle units removably supported in pivotal relation thereon and comprising means for separating and holding the yolk and the white of an egg, and means for driving the table including a source of power and a driving connection between the table and the source of power.

17. In an apparatus of the character described, a receptacle unit comprising a cup and saucer, the cup having a movable flaring rim, means for automatically lifting the rim to permit a portion of the contents of the cup to fall into the saucer, and means for tilting the receptacle unit to discharge the contents of the cup and saucer.

18. In an apparatus of the character described, means for separating the yolk and the white of an egg including a cup and saucer, the saucer having a glass bottom, whereby light may be transmitted through the contents thereof for purpose of examination.

19. In an apparatus of the character described, means for separating the yolk and the white of an egg including a cup and saucer, the saucer having a glass bottom, whereby light may be transmitted through the contents thereof for purpose of examination, said glass bottom being removably secured to the saucer.

20. In an apparatus of the character described, a plurality of means for separating the yolks and whites of eggs each including a cup and saucer, the saucers having glass bottoms, means for conveying the separating means and illuminating means adapted to direct light through the glass bottom of each saucer successively.

21. In an apparatus of the character described, the combination of a plurality of receptacle units each comprising means for separating and holding respectively the yolk and the white of an egg, means for conveying the receptacle units, means for intermittently advancing the conveying means, and means for discharging the contents thereof.

In testimony whereof I affix my signature.

JOHN W. ESKHOLME.